(12) United States Patent
Ben Dayan et al.

(10) Patent No.: US 11,455,275 B2
(45) Date of Patent: Sep. 27, 2022

(54) STORING A POINT IN TIME COHERENTLY FOR A DISTRIBUTED STORAGE SYSTEM

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL)

(73) Assignee: Weka.IO Ltd.

( * ) Notice: Subject to any disclaimer, the term of this patent is extended or adjusted under 35 U.S.C. 154(b) by 184 days.

(21) Appl. No.: 16/274,451

(22) Filed: Feb. 13, 2019

(65) Prior Publication Data

US 2020/0026612 A1   Jan. 23, 2020

Related U.S. Application Data

(60) Provisional application No. 62/699,902, filed on Jul. 18, 2018.

(51) Int. Cl.
*G06F 16/11* (2019.01)
*G06F 11/14* (2006.01)
*G06F 16/182* (2019.01)

(52) U.S. Cl.
CPC ........ *G06F 16/128* (2019.01); *G06F 11/1451* (2013.01); *G06F 16/182* (2019.01); *G06F 2201/84* (2013.01)

(58) Field of Classification Search
CPC .............. G06F 16/128; G06F 2201/84; G06F 11/1451; G06F 16/134; G06F 16/1734; G06F 16/1727; G06F 16/182; G06F 16/00; G06F 17/00; G06F 17/30; G06F 3/0608; G06F 3/064; G06F 16/9024; G06F 16/9027

USPC ..................... 707/639, 649, 822, 8
See application file for complete search history.

(56) References Cited

U.S. PATENT DOCUMENTS

| | | | |
|---|---|---|---|
| 5,592,667 A * | 1/1997 | Bugajski | H03M 7/3084 |
| 6,487,636 B1 | 11/2002 | Dolphin et al. | |
| 7,447,839 B2 * | 11/2008 | Uppala | G06F 11/1052 711/114 |
| 7,681,072 B1 | 3/2010 | Gibson et al. | |
| 7,793,146 B1 | 9/2010 | Gibson et al. | |
| 8,316,074 B2 * | 11/2012 | McManis | H04L 12/44 709/200 |
| 8,645,749 B2 | 2/2014 | Reche | |
| 8,918,478 B2 | 12/2014 | Ozzie et al. | |
| 9,087,012 B1 | 7/2015 | Hayes et al. | |
| 9,448,887 B1 * | 9/2016 | Ben Dayan | G06F 3/067 |
| 9,465,696 B2 * | 10/2016 | McNeil | G06F 11/1451 |
| 9,720,619 B1 * | 8/2017 | Shah | G06F 12/0811 |

(Continued)

OTHER PUBLICATIONS

Int'l Search Report and Written Opinion Appln No. PCT/IB2016/001177 dated Dec. 2, 2016.

(Continued)

*Primary Examiner* — Phong H Nguyen

(74) *Attorney, Agent, or Firm* — McAndrews Held & Malloy, Ltd.

(57) ABSTRACT

A plurality of computing devices are communicatively coupled to each other via a network, and each of the plurality of computing devices is operably coupled to one or more of a plurality of storage devices. The computing devices may take snapshots to store points in time coherently for a distributed storage system.

20 Claims, 6 Drawing Sheets

(56) References Cited

U.S. PATENT DOCUMENTS

| | | | |
|---|---|---|---|
| 10,339,101 B1* | 7/2019 | Gupta | G06F 16/128 |
| 2006/0218362 A1* | 9/2006 | McManis | H04L 69/329 |
| | | | 711/162 |
| 2009/0055607 A1 | 2/2009 | Schack et al. | |
| 2010/0161556 A1* | 6/2010 | Anderson | G06F 16/174 |
| | | | 707/638 |
| 2010/0199125 A1 | 8/2010 | Reche | |
| 2011/0058564 A1* | 3/2011 | Sugawara | H04L 49/10 |
| | | | 370/401 |
| 2013/0103644 A1* | 4/2013 | Shoens | G06F 16/1873 |
| | | | 707/638 |
| 2014/0149664 A1* | 5/2014 | Ezra | G06F 12/0864 |
| | | | 711/114 |
| 2015/0200818 A1* | 7/2015 | Winkelstrater | H04L 41/12 |
| | | | 709/223 |
| 2015/0355971 A1 | 12/2015 | Becker-Szendy et al. | |
| 2016/0034507 A1* | 2/2016 | Aron | G06F 16/16 |
| | | | 707/722 |
| 2016/0246677 A1 | 8/2016 | Sangamkar et al. | |
| 2017/0003899 A1* | 1/2017 | Raja | G06F 3/065 |
| 2017/0052847 A1* | 2/2017 | Ben Dayan | G06F 11/1076 |
| 2019/0065508 A1* | 2/2019 | Guturi | G06F 16/2246 |
| 2019/0073378 A1* | 3/2019 | Guturi | G06F 16/185 |
| 2020/0004852 A1* | 1/2020 | Qiu | G06F 16/128 |

OTHER PUBLICATIONS

Int'l Search Report and Written Opinion Appln No. PCT/IB2019/000732 dated May 1, 2020.

Barker. R. et al. Storage Area Network Essentials: A Complete Guide to Understanding and 1-20 Implementing SANs, (excerpts) John Wiley & Sons 2002 [retrieved on Mar. 21, 2020]. Retrieved from the Internet: <https: IIvdocuments.mxldownload/storage-area-networking-essentials-acomplete-guide-to-understanding-implementing>; entire document.

Int'l Preliminary Report on Patentability Appln No. PCT/IB2019/000732 dated Jan. 28, 2021.

* cited by examiner

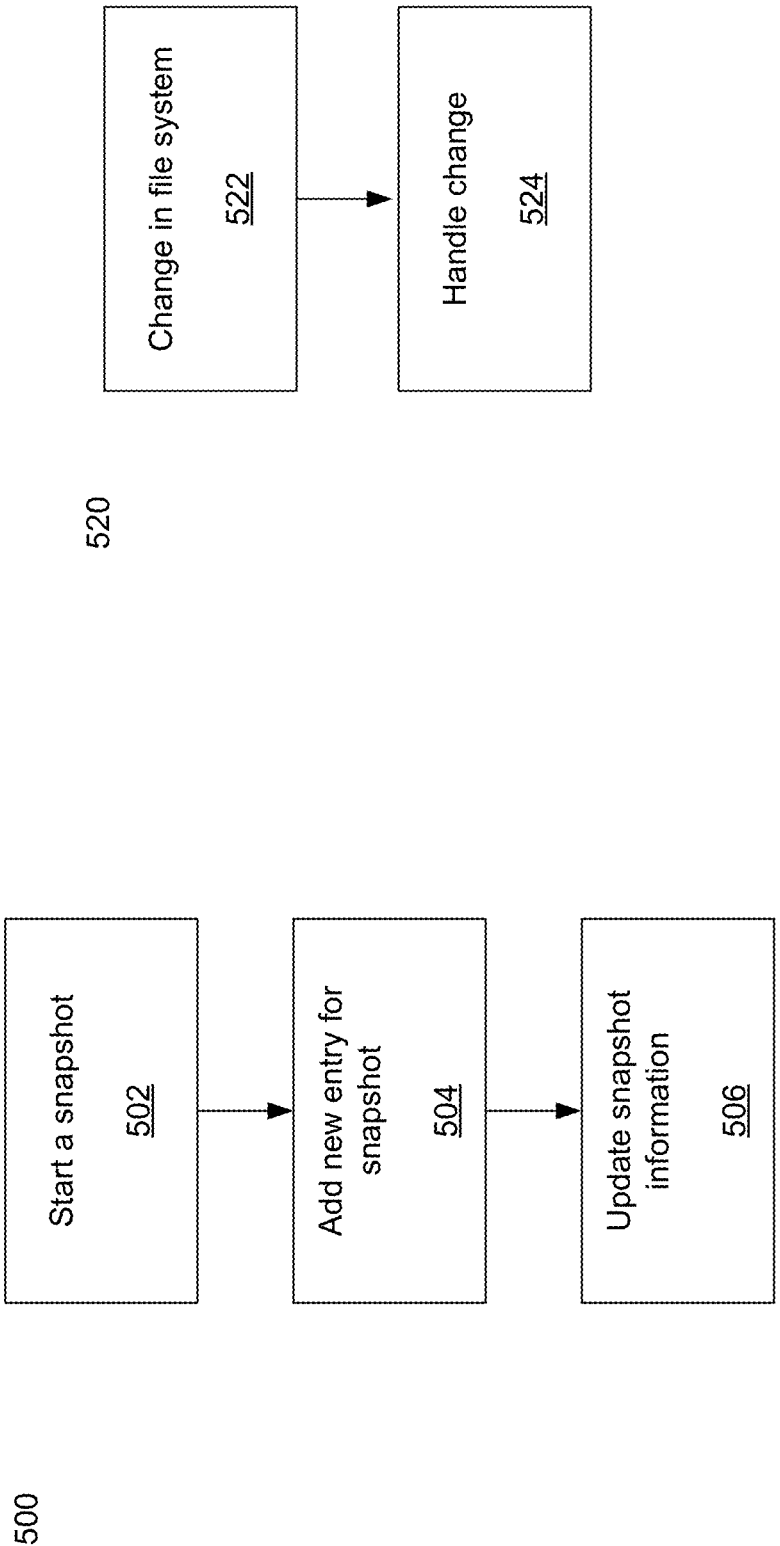

STORING A POINT IN TIME COHERENTLY FOR A DISTRIBUTED STORAGE SYSTEM

PRIORITY CLAIM

This application claims priority to the following application, which is hereby incorporated herein by reference: U.S. provisional patent application 62/699,902 titled "STORING A POINT IN TIME COHERENTLY FOR A DISTRIBUTED STORAGE SYSTEM" filed on Jul. 18, 2018.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

BRIEF SUMMARY

Methods and systems are provided for storing a point in time coherently for files in a distributed storage system substantially as illustrated by and/or described in connection with at least one of the figures, as set forth more completely in the claims.

BRIEF DESCRIPTION OF THE DRAWINGS

FIG. 5A illustrates an example flow diagram of taking a snapshot in accordance with an example implementation of this disclosure.

FIG. 5B illustrates an example flow diagram of changes to a file system in accordance with an example implementation of this disclosure.

DETAILED DESCRIPTION

Traditionally, file systems use a centralized control over the metadata structure (e.g., directories, files, attributes, file contents). If a local file system is accessible from a single server and that server fails, the file system's data may be lost if as there is no further protection. To add protection, some file systems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory such as, for example, RAM, for fast access, and may be backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the file system's namespace, this load can be distributed across a plurality of nodes.

Figure 1:
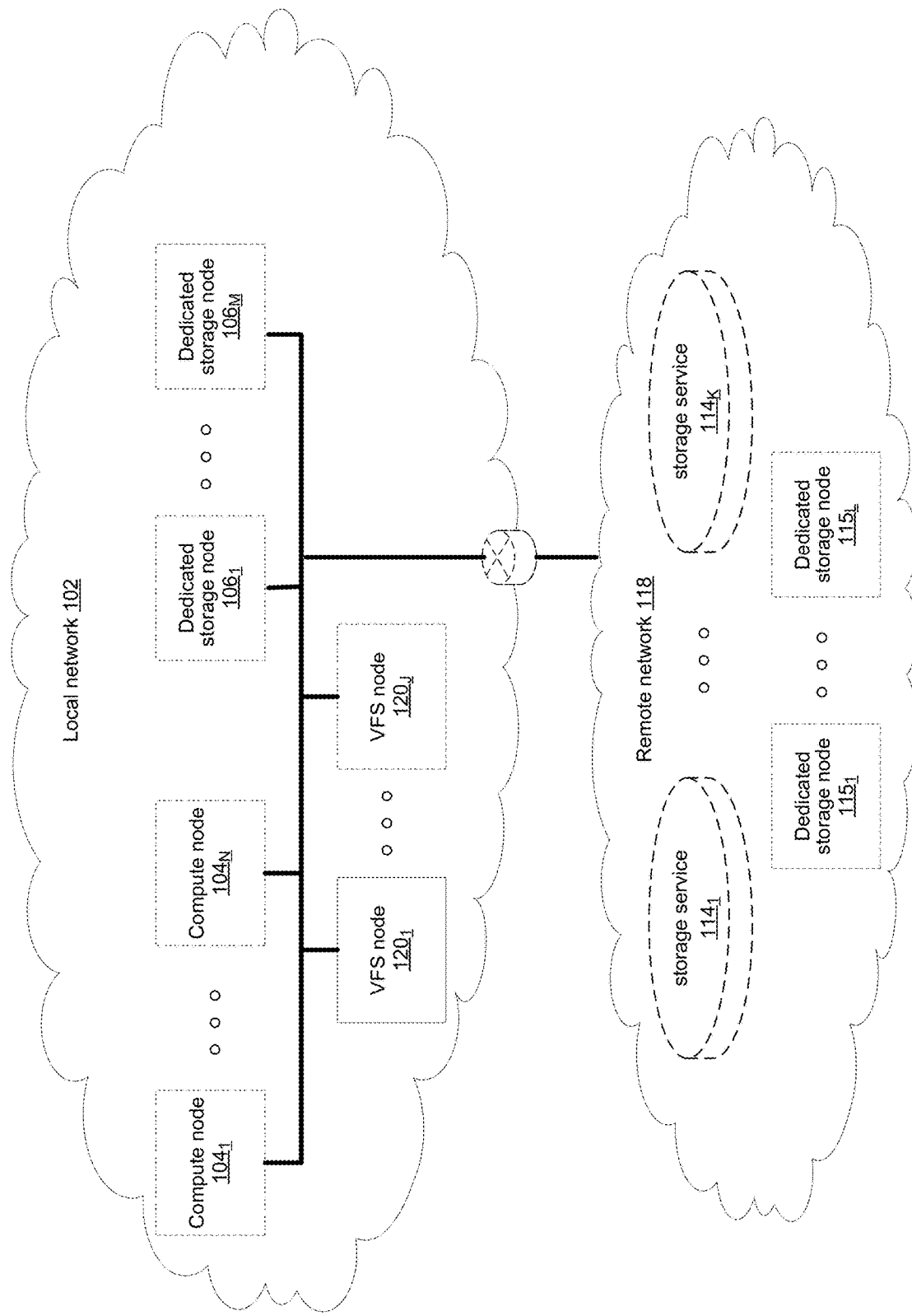
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for $j \geq 1$), and optionally comprising (indicated by dashed lines): one or more dedicated storage nodes 106 (indexed by integers from 1 to M, for $M \geq 1$), one or more compute nodes 104 (indexed by integers from 1 to N, for $N \geq 1$), and/or an edge router that connects the LAN 102 to a remote network 118. The remote network 118 optionally comprises one or more storage services 114 (indexed by integers from 1 to K, for $K \geq 1$), and/or one or more dedicated storage nodes 115 (indexed by integers from 1 to L, for $L \geq 1$).

Each VFS node 120j (j an integer, where $1 \leq j \leq J$) is a networked computing device (e.g., a server, personal computer, or the like) that comprises circuitry for running VFS processes and, optionally, client processes (either directly on an operating system of the device 104n and/or in one or more virtual machines running in the device 104n).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
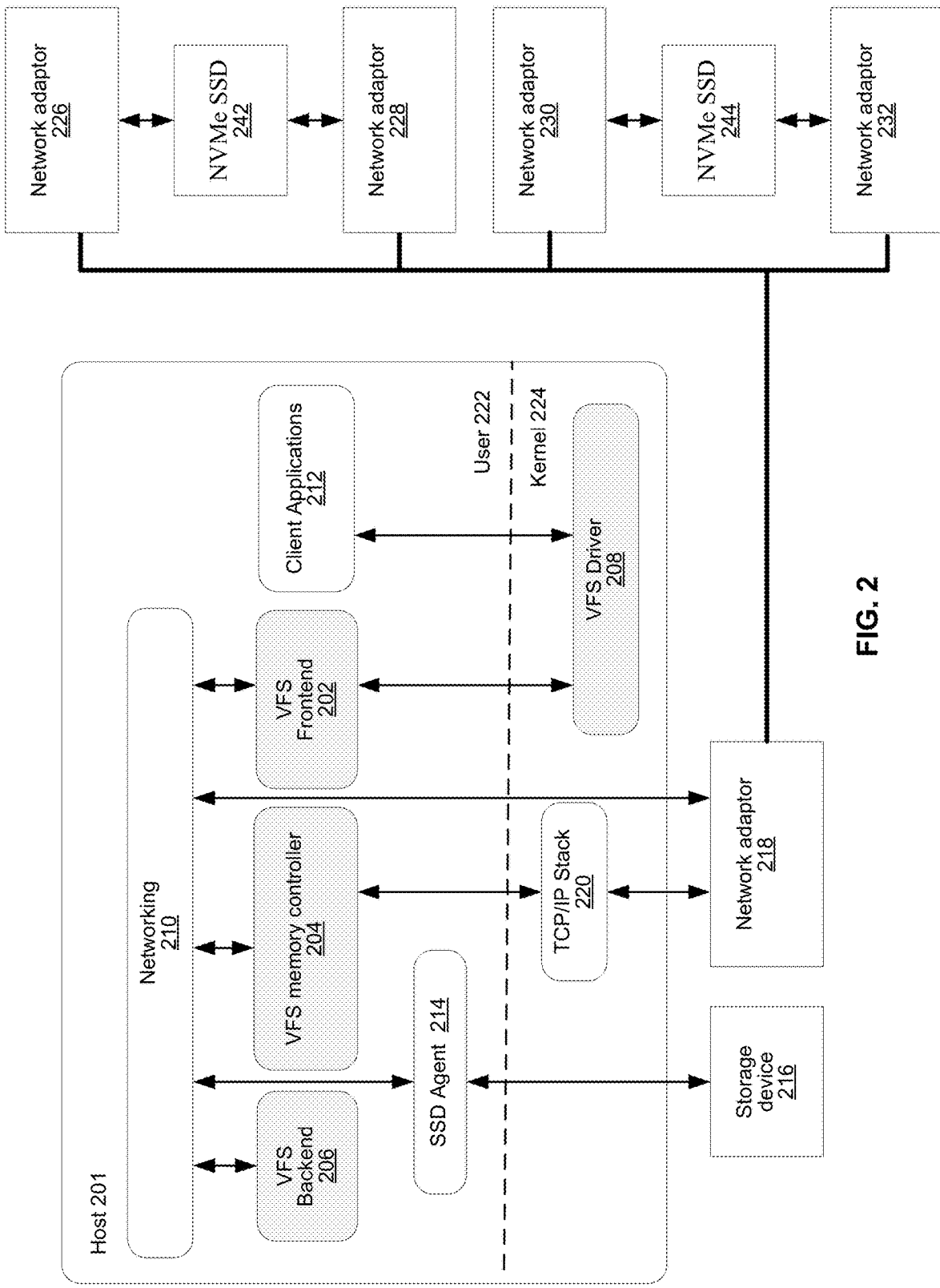
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage device 216 attached via a PCI Express (PCIe) bus. The non-volatile storage device 216 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD, for example, the non-volatile storage device 216, with the SSD agent 214 and networking 210. Alternatively, the SSD may be implemented as a network-attached NVMe SSD 242 or 244 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 242 and 244 to transform them into networked NVMe-oF devices without the use of a server. The NVMe SSDs 242 and 244 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective non-volatile storage device 216. This may include, for example, translating addresses, and generating the commands that are issued to the storage device (e.g., on a SATA, SAS, PCIe, or other suitable bus). Thus, the VFS SSD agent 214 operates as an intermediary between a non-volatile storage device 216 and the VFS backend 206 of the virtual file system. The SSD agent 214 could also communicate with a standard network storage device supporting a standard protocol such as NVMe-oF (NVMe over Fabrics).

Figure 3:
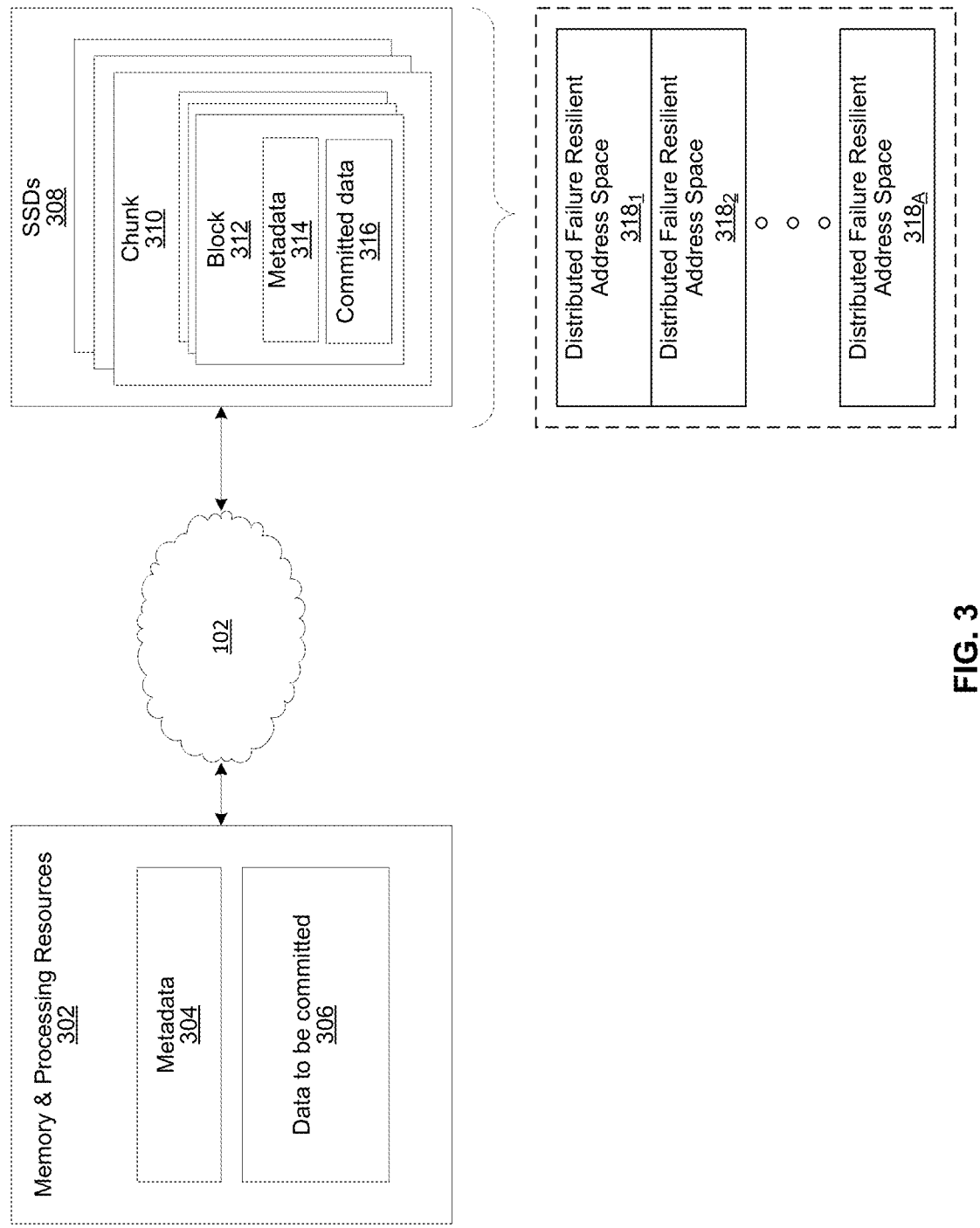
FIG. 3 illustrates an example configuration of a virtual file system node in accordance with aspects of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2A above. The element 308 represents the one or more physical non-volatile storage devices 216 which provide the long term storage of the virtual file system.

As shown in FIG. 3, the physical storage is organized into a plurality of distributed failure resilient address spaces (DFRASs) 318. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather than the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire file system metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than $$64,000 \left( \frac{26!}{5! * (26-5)!} \right)$$

possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the file system. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Because each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 318) and does not need to cooperate with other buckets to perform read or write operations. There are potentially thousands of concurrent, distributed erasure coding instances working concurrently, each for the different bucket. This is an integral part of scaling performance, as it effectively allows any large file system to be divided into independent pieces that do not need to be coordinated, thus providing high performance regardless of the scale.

Each bucket handles all the file systems operations that fall into its shard. For example, the directory structure, file attributes, and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

Various embodiments of the storage system may allow taking a snapshot to save a data set at a particular point in time. The snapshot may comprise, for example, differential information with respect to a previous snapshot or an image. The storage system may allow snapshots at a file system level such as, for example, a bucket level. When the snapshot data is managed at the bucket level, the snapshot workload may be shared across all buckets. Therefore, each bucket manages all the snapshots for all its managed objects such as, for example, directories, inodes, file data ranges, etc. A processor, such as, for example, a processor of the host 201 or on a processor of the network adaptor 218, or any other processor that may be appropriate as shown on FIGS. 1 and 2, may be used for managing the snapshots. For example, the snapshot management may be performed by the leader of a bucket. The snapshot management may be visible to a user via, for example, a user interface.

Figure 4:
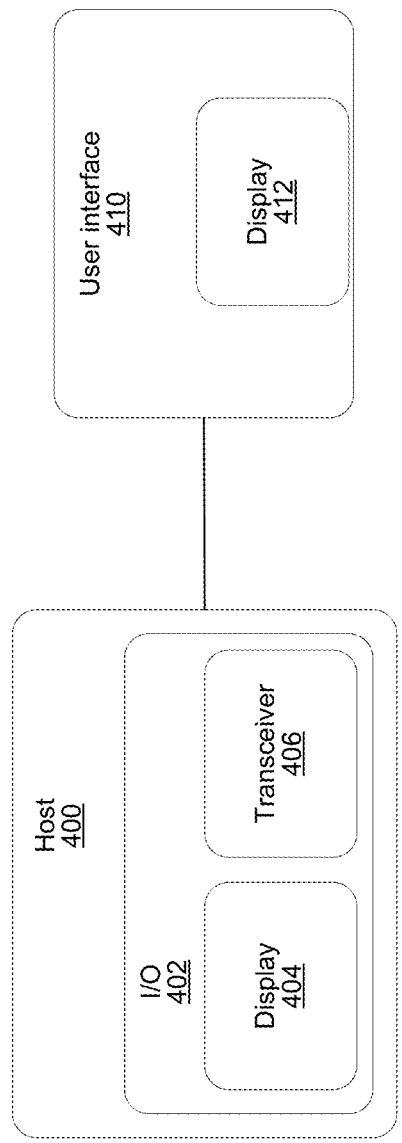
FIG. 4 illustrates a user interface for a storage system in accordance with an example implementation of this disclosure.

FIG. 4 illustrates a user interface for an example host of a storage system in accordance with an example implementation of this disclosure. Referring to FIG. 4, there is shown a host 400 communicatively coupled, either wired or wirelessly, to the user interface 410. The host 400 may be similar to the host 201. The host 400 may also have, for example, an input/output (I/O) interface 402 that allows communication with the user interface 410. The I/O interface 402 may also comprise one or more input devices such as, for example, mouse, trackball, keyboard, buttons, touch panel, etc. that allows a user to enter information. The I/O interface 402 may also have one or more output devices such as, for example, lights/LEDs, speaker, display, etc. that allows a user to see or hear various outputs. Accordingly, the host 400 may have a display 404. The host 400 may also have, for example, a transceiver 406 that may be suitable for communicating with another electronic device via one or more wired protocols and/or one or more wireless protocols. Wired protocols may be, for example, USB, Firewire, SCSI, etc. Wireless protocols may be, for example, a cellular protocol, WiFi, Bluetooth, NFC (Near Field Communication), etc.

Accordingly, the I/O stack 210, the TCP/IP stack 220, and/or the network adaptor 218 may be thought of as being a part of the I/O interface 402. The I/O interface 402 may be a logical grouping of input/output devices and applicable software.

Various embodiments may also communicate with the user interface 410, which may be similar to the I/O interface 402.

Depending on the application software, the user interface 410 and/or the I/O interface 402 may be used to access information, status, etc. for any level of the storage system. For example, the access may be to a specific node, a file system, the entire storage system, etc.

A snapshot may be taken on demand by a user, periodically, or at certain set times. When a snapshot is allowed to be taken may be a design and/or implementation decision. The user may determine when the snapshots are taken. Various embodiments may take an initial snapshot of a data set for a bucket, and subsequent snapshots may copy the changed data. A system of pointers may be used to reference the initial snapshot and subsequent snapshots.

Each inodeid for a file (or directoryid for a directory, etc.) may also have a snapshot index (or snapshotID). There may also be a constant special snapshot index that never changes. This special snapshot index is the current view (or the latest snapshot) of the file system, and may be referred to as "defaultSnapID." This special snapshot index may constantly store the differential information as the file system is changed, and a snapshot will keep that information at a particular point in time. When the snapshot is taken, the snapshot information will be saved at a new snapshot index and the defaultSnapID will gather new information from that point on.

A full inodeId may comprise, for example, the basic inodeId+snapshotID. The registry may keep track for each object it manages the "current" instance for that object by using inodeId+defaultSnapID to locate the current snapshot.

As snapshots may be taken multiple times, there may be a tree of snapshots that is managed by the configuration service of the cluster of nodes for the storage system. The configuration service of the cluster may keep track of, for example, what nodes are available, and what current buckets are on the storage system. Accordingly, all buckets know the relationships among snapshots. A snapshot may be written to since it is a "clone," and a snapshot may be taken of the altered snapshot. But even if the snapshot configuration has just a single line going forward to the next snapshot, a knowledge of how the snapshots are ordered may be needed to view a specific snapshot.

When writing over a file after a snapshot, the file has an extent with the most up-to-date snapshotID, that extent may be altered. If an extent with the latest snapshot index (snapshotID) cannot be retrieved from the registry, the latest snapshotID may be fetched from the registry by fetching the special entry that asks for the latest extent for this extentId, which the registry keeps. Another extent may then be created with the right extentId and the most up-to-date snapshotID. This latest extent now has a pointer to the previous extent that is relevant and a standard write may be performed. A previous extent is relevant if it has the snapshotID of the extent that was received from the registry.

All the changes that are made in a context of a snapshot may be kept in an OnDiskHash (ODH). That ODH can be used in case a snapshot is deleted. For example, all the entries of that ODH can be reviewed. Changes that occurred in a deleted snapshot may be pushed to later snapshots, and all other changes may be discarded. As an example, if there is file modification information for a file that does not exist in the next snapshot, there is no need to keep that information if that snapshot is deleted.

The ODH may contain all modifications that happened in the last snapshot in an un-ordered way. So even if an extent was modified few times, there may only be one entry. If a file was created, but then deleted before another snapshot is taken, the ODH will contain no reference to that file.

Users of the storage system may use a snapshot for a variety of purposes. For example, a user may use a snapshot to backup time consistent replicas to a different storage system (physical backup). This may allow users to create recurring time consistent replicas in order to archive systems (logical backup). This may also allow users to derive multiple images by taking a replica of a single gold image and change it (image management). Users may also use a snapshot to develop and test a system under multiple scenarios using multiple replicas of the input data.

One embodiment of the disclosure may allow a user to take a snapshot of an existing file system. For example, the snapshot may be at a bucket level, or some other level that may be at a higher or a lower level than the bucket level. The user(s) may be allowed to access the snapshot under a dedicated directory name. The snapshot may also be made writable. A snapshot of a snapshot may also be taken. This may be useful, for example, for a writable snapshot that has some portion of it changed, or for a read-only snapshot before it is made writable. Various embodiments may also allow a snapshot to be deleted. A snapshot may also allow the source file system to be restored if the intervening snapshots, if applicable, are available.

For example, if a snapshot of a file system is taken at time X, then the snapshot may be used to restore the file system to its state at time X. If there are other snapshots from time X to time X+nP, where n may be some integer number of a time period P, then those snapshots may be used to restore the file system to any time from time X to time X+nP. There may be some upper limit to the number of snapshots that may be taken. For example, some embodiments may allow an upper limit of 4,096 snapshots per file system, where the file system may be, for example, a bucket. Various embodiments may allow different numbers of snapshots.

Snapshots may be taken on the whole file system or some subset of the file system. File system snapshots may be presented to the user as, for example, a directory included in a snapshot directory under the root file system. The name of the directory may be specified in a command that creates a snapshot. An attempt to move a file or a directory in or out a snapshot directory may not be supported in some embodiments. The result of trying to move a file or a directory may be, for example, the same as a system command to copy/move between file systems. A snapshot can be created, and various embodiments may allow a snapshot to be made writable, to be deleted, and/or to be updated to contain the current content of the file system or another snapshot.

Accordingly, each snapshot may designated to work with a file system, such as, for example, a bucket, and the snapshotID that is a string, where the snapshotID is unique per file system. This may allow different "nightly backup" snapshots on many file systems or files.

FIG. 5A illustrates an example flow diagram of taking a snapshot in accordance with an example implementation of this disclosure. Referring to FIG. 5A, there is shown the flow diagram 500 with blocks 502 to 506. At block 502, a snapshot may be started. The snapshot may be, for example, on demand, periodically, or other times. For example, a snapshot may be made half-way through a business day, and then at the end of the business day.

At block 504, a new entry may be made for the snapshot. Snapshots may be maintained in the file system configuration by using, for example, tables. Accordingly, the latest entry may be, for example, in a snapshot table and a file system (FS) view table. The entry in the snapshot table may have several fields that are filled. The fields may be, for example, for a snapshotID, a pointer to its parent, the left child, and the right child. There may also be, for example, a file system id that may be useful for debugging. The file system view table may be, for example, for the user, and each entry may comprise a field for a name and a field for a pointer to the snapshotID. The name may follow a name format set up by the user such that the name may be meaningful to the user. Accordingly, the new entry in the file system view table may point to the new entry in the snapshot table.

At block 506, the entries for the latest snapshot may be populated with relevant information. The registry may also be updated with objects related to the latest snapshot, where a registry key for each object may be calculated on (object key, snapshotID). Accordingly, different versions of objects may be stored with different registry keys.

A source snapshot field may be generated upon the snapshot creation, and this field may indicate either a snapshot or a "latest copy." If later on the source snapshot is deleted, this field becomes invalid.

A snapshot may be designated as being writable using, for example, a Boolean field. File/directory name may be designated for accessing the snapshots, and a snapshot may be tagged with a time stamp that indicates when it was created.

In general, snapshots may be uniquely identified by a (file_system, name, type, file path) tuple. The type may indicate, for example, whether the snapshot is for the file system, a directory, file, or any other attribute that may be desired.

Accordingly, when taking (or creating) a snapshot, a new entry may be created in the snapshot table, and the existing FS view table may be pointed to it. New FS objects may be created with the new snapshotID. The existing FS view may be pointed to the latest snapshot via its snapshotID. Regarding references in the registry, the registry key may be calculated on the parameters (object key, snapshotID). Thus, different versions of objects can be stored with different registry keys.

FIG. 5B illustrates an example flow diagram of changes to a file system in accordance with an example implementation of this disclosure. Referring to FIG. 5B, there is shown the flow diagram 520 with blocks 522 to 524. At block 522, a change in a file system may take many forms. For example, there may be a write, a file or directory deletion, file truncation, etc.

At block 524, the various changes may be handled. Regarding extent copy on write, a new extent may be created with the current snapshotID. In place of the block ids inherited from the previous snapshot, there may be a reference to the snapshot index (snapshotID) of the extent that owns them. If the snapshot context is the live file system, then the latest extent pointer is updated. If there is a pointer in the place where an extent should be created, the pointer may be converted to a fully-fledged extent.

Extent lookup comes with a snapshot context that includes the snapshotID. The extent is searched with this snapshotID. If it is not found, the bucket will traverse the snapshot tree upwards and search for the extent using every snapshotID. All these searches will be in memory, unless there are hash collisions. Once an extent is found, if the sought data blocks are owned by ancestor extents, those blocks are retrieved in parallel, and then the data blocks can be read (or the block info descriptors can be sent to the frontend).

When attributes of an inode are changed, the inode will be copied just like an extent.

New dirents, or directory entries, will be created with snapshotID, just like other objects. When deleting a dirent, the bucket may denote in the snapshot that the dirent does not exist, so a "tombstone" may be created. A tombstone may be a dirent that signifies that it has been deleted. If this is not done, the original dirent will be found.

When truncating a file, the file system, for example, the bucket, scans for the extents and leaves the tombstones where there are extents that are supposed to be removed. There may not be a need for tombstones for sparse files with no extent, or past the end of the file.

When deleting a file, a tombstone may be left instead of the inode. Tombstones are not left for the removed extent. The tombstone is needed to facilitate merge on delete. When merging extents of a deleted snapshot, it is useful to know if the extents exist in the child snapshot. If the file is deleted with no tombstone there won't be a way to know.

Figure 6:
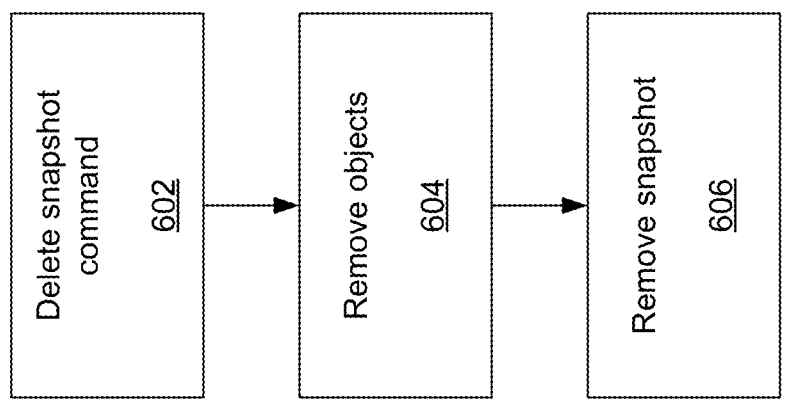
FIG. 6 illustrates an example flow diagram of deletion of a snapshot in accordance with an example implementation of this disclosure.

FIG. 6 illustrates an example flow diagram of deletion of a snapshot in accordance with an example implementation of this disclosure. Referring to FIG. 6, there is shown the flow diagram 600 with blocks 602 to 606. At block 602, a command may be received to delete a particular snapshot. The command may be received via, for example, a user interface used for managing the storage system, the file system, etc. The user interface may be a part of a node in the storage system, such as, for example, the I/O interface 402, or the user interface 410.

At block 604, as a snapshot is deleted, the file system, for example, the bucket, may enumerate the objects that belong to the snapshot and remove them. To do this, the bucket may have to scan up the tree to find the first snapshot of the tree (the "−1 version").

If there is no instance of the inode in the next snapshot, the inode needs to be moved to that snapshot. Otherwise the snapshot can be removed. If the inode in the next snapshot is a tombstone, and there is no −1 version, they can both be removed. The process may also not search for the −1 version, and leave the tombstone.

Dirents may be treated the same as inodes for snapshot deletion.

If the extent is not present in the next snapshot, a pointer is created in the next snapshot that points to the extent in the deleted snapshot. This may allow the original extent to still reference the blocks, while the registry is still able to reference the extent. The pointer is in the object index of the next snapshot.

If an extent exists in the next snapshot, any blocks that are not referenced from that extent are freed. If all blocks are freed, the extent itself can be removed.

At block 606, when deleting a snapshot that contains a pointer, the pointer is moved to the next snapshot if there is not an extent in the next snapshot. If there is an extent in the next snapshot, the pointed extent should be examined as if its snapshot was just deleted.

Figure 7:
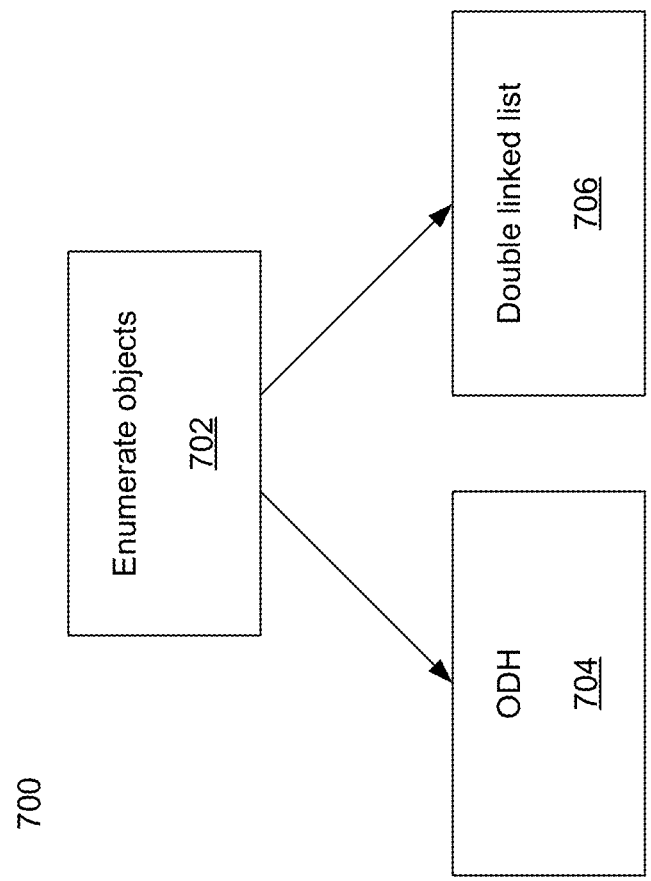
FIG. 7 illustrates an example flow diagram of deletion of a snapshot in accordance with an example implementation of this disclosure.

FIG. 7 illustrates an example flow diagram of deletion of a snapshot in accordance with an example implementation of this disclosure. Referring to FIG. 7, there is shown the flow diagram 700 with blocks 702 to 706. At block 702, objects may need to enumerated. Various embodiments may use different methods for enumerating, or identifying, FS objects that belong to a snapshot. For example, various embodiments may consider two options. At block 704, option 1 may be to use an on-disk hash table that can be reused in other places in the system. Or at block 706, option 2 may be to maintain a double linked list between the objects. Option 2 may cause more updates on creations and removals. While option 1 may waste more capacity, since option 1 reuses an existing structure there might be less code. While only one of option 1 or option 2 may be used in an embodiment, both options are disclosed.

One snapshot (clone) is special—this is the live file system. The most activity can be expected to be on it, accordingly access to its objects may be made faster. This may be done by maintaining in the registry a pointer to the last extent (or dirent or inode), and update it when a newer version is created in a snapshot.

When a file level snapshot is created, the inode is duplicated, and a new dirent is created as an entry point. File level snapshots may be managed just like file system level snapshots. That is, there is a snapshot tree in the configuration, and the extents are handled the same way.

For an interface for accessing file system level snapshots, there may be some options. For example, one option may have the new snapshot exported as a file system and mount the file system to be accessed. Another option may be to have a snapshots directory under the root directory, with the snapshot root of every snapshot in there.

With regard to a rebuild, data blocks are always directly referenced by one extent—the extent that owned them when they were written. Their backpointers point to that extent. Therefore rebuild works as usual.

For restoring from a snapshot, this may consist of pointing the FS view to another snapshot, and deleting the previous one. There may be validation to ensure that there are no open files on the view, and then the configuration may be changed.

In general, snapshots may be uniquely identified by the (file_system, name, type, file path) tuple. While there may be various operations for a snapshot, some commands may be, for example, Create Snapshot, Update Snapshot Parameters, Snapshot Copy, Restore From Snapshot, Delete Snapshot, and List Snapshots.

Update Snapshot Parameters command may, for example, allow certain parameters to be updated. For example, whether the name may be changed.

Snapshot Copy may provide an instant copy of a snapshot or of the current content into an existing snapshot.

Restore From Snapshot may be used to restore the current content of a file system or file by the content of a snapshot.

List Snapshots may be used to list all snapshots that match the input parameters. If no parameters are given, then all snapshots in the system may be listed.

Accordingly, it can be seen that an implementation of the disclosure may be a method for using a distributed storage system that comprises taking a snapshot of a file system distributed across multiple storage nodes, maintaining the snapshot for the file system using a snapshot table and a file system views table, and providing a snapshot index (snapshotID) for accessing the snapshot, where a constant snapshot index is provided for a current view of the file system. The snapshot may be writeable.

The file system may be distributed across five nodes. The snapshot table may comprise one or more entries, and each of the one or more entries may have a snapshot index field, a pointer to its parent, a pointer to a left child, and a pointer to a right child. Furthermore, the snapshot table may comprise a file system identification.

The file system views table may comprise one or more entries, and each of the one or more entries has a name field and a pointer to a corresponding snapshot. The method may also comprise enumerating file system objects that belong to the snapshot, where the enumeration may be done via an on-disk hash or the enumeration may be done with double-linked lists for the file system objects.

Another implementation of the disclosure may be a distributed storage system that comprises a file system distributed across multiple storage nodes. The file system may comprise a processor, where the processor is configured to: take a snapshot of the file system, maintain the snapshot for the file system using a snapshot table and a file system views table, and provide a snapshot index for accessing the snapshot, where a constant snapshot index is provided for a current view of the file system.

The file system may be distributed across five storage nodes. The processor may be configured to populate one or more entries for the snapshot table, wherein each of the one or more entries has a snapshot index field, a pointer to its parent, a pointer to a left child, and a pointer to a right child. The processor may be configured to populate a file system identification field in the snapshot table and to populate one or more entries for the file system views table, wherein each of the one or more entries has a name field and a pointer to a corresponding snapshot.

Still another implementation of the disclosure may be a machine-readable storage having stored thereon, a computer program having at least one code section for taking snapshots in a storage system, the at least one code section comprising machine executable instructions for causing the machine to perform steps comprising taking a snapshot of a file system distributed across multiple storage nodes, maintaining the snapshot for the file system using a snapshot table and a file system views table, and providing a snapshot index for accessing the snapshot, where a constant snapshot index is provided for a current view of the file system.

The file system may be distributed across five nodes. The snapshot table may comprise one or more entries, and each of the one or more entries may have a snapshot index field, a pointer to its parent, a pointer to a left child, and a pointer to a right child. The snapshot table may comprise a file system identification. The file system views table may comprise one or more entries, and each of the one or more entries may have a name field and a pointer to a corresponding snapshot.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What are claimed:

1. A method for a distributed storage system, comprising:
taking a snapshot of a file system distributed across multiple storage nodes, wherein the snapshot is taken on the whole file system, and wherein the snapshot is not taken on a subset of the file system;
maintaining the snapshot for the file system using a snapshot table and a file system views table; and
providing a snapshot index for accessing the snapshot, wherein:
a constant snapshot index is provided for a current view of the file system,
the file system comprises a plurality of buckets,
each of the plurality of buckets is operable to write to a unique stripe, and
each of the plurality of buckets is independent of each other of the plurality of buckets.

2. The method of claim 1, wherein the file system is distributed across five nodes.

3. The method of claim 1, wherein the snapshot table comprises one or more entries, and each of the one or more entries has a snapshot index field, a pointer to its parent, a pointer to a left child, and a pointer to a right child.

4. The method of claim 3, wherein the snapshot table comprises a file system identification.

5. The method of claim 1, wherein the file system views table comprises one or more entries, and each of the one or more entries has a name field and a pointer to a corresponding snapshot.

6. The method of claim 1, wherein the snapshot is writeable.

7. The method of claim 1, comprising enumerating file system objects that belong to the snapshot.

8. The method of claim 7, wherein the enumeration is done via an on-disk hash.

9. The method of claim 7, wherein the enumeration is done with double-linked lists for the file system objects.

10. A distributed storage system comprising:
a file system distributed across multiple storage nodes; and
a processor, wherein the processor is configured to:
take a snapshot of the file system, wherein the snapshot is taken on the whole file system, and wherein the snapshot is not taken on a subset of the file system;
maintain the snapshot for the file system using a snapshot table and a file system views table; and
provide a snapshot index for accessing the snapshot, wherein:
a constant snapshot index is provided for a current view of the file system,
the file system comprises a plurality of buckets,
each of the plurality of buckets is operable to write to a unique stripe, and
each of the plurality of buckets is independent of each other of the plurality of buckets.

11. The system of claim 10, wherein the file system is distributed across five storage nodes.

12. The system of claim 10, wherein the processor is configured to populate one or more entries for the snapshot table, wherein each of the one or more entries has an identification (ID) field, a pointer to its parent, a pointer to a left child, and a pointer to a right child.

13. The system of claim 12, wherein the processor is configured to populate a file system identification field in the snapshot table.

14. The system of claim 10, wherein the processor is configured to populate one or more entries for the file system views table, wherein each of the one or more entries has a name field and a pointer to a corresponding snapshot.

15. A non-transitory machine-readable storage medium having stored thereon, a computer program having at least one code section for taking snapshots in a storage system, the at least one code section comprising machine executable instructions for causing the machine to perform steps comprising:
taking a snapshot of a file system distributed across multiple storage nodes, wherein the snapshot is taken on the whole file system, and wherein the snapshot is not taken on a subset of the file system;
maintaining the snapshot for the file system using a snapshot table and a file system views table; and
providing a snapshot index for accessing the snapshot, wherein:
a constant snapshot index is provided for a current view of the file system,
the file system comprises a plurality of buckets,
each of the plurality of buckets is operable to write to a unique stripe, and
each of the plurality of buckets is independent of each other of the plurality of buckets.

16. The non-transitory machine-readable storage medium of claim 15, wherein the file system is distributed across five nodes.

17. The non-transitory machine-readable storage medium of claim 15, wherein the snapshot table comprises one or more entries, and each of the one or more entries has a snapshot index field, a pointer to its parent, a pointer to a left child, and a pointer to a right child.

18. The non-transitory machine-readable storage medium of claim 17, wherein the snapshot table comprises a file system identification.

19. The non-transitory machine-readable storage medium of claim 15, wherein the file system views table comprises one or more entries, and each of the one or more entries has a name field and a pointer to a corresponding snapshot.

20. The non-transitory machine-readable storage medium of claim 15, wherein the snapshot is writeable.

* * * * *